United States Patent
Shimotani et al.

(10) Patent No.: US 12,409,858 B2
(45) Date of Patent: Sep. 9, 2025

(54) DRIVING ASSISTANCE CONTROL DEVICE AND DRIVING ASSISTANCE CONTROL METHOD

(71) Applicant: Mitsubishi Electric Corporation, Tokyo (JP)

(72) Inventors: Mitsuo Shimotani, Tokyo (JP); Tadashi Miyahara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 112 days.

(21) Appl. No.: 18/026,459

(22) PCT Filed: Dec. 10, 2020

(86) PCT No.: PCT/JP2020/045979
§ 371 (c)(1),
(2) Date: Mar. 15, 2023

(87) PCT Pub. No.: WO2022/123713
PCT Pub. Date: Jun. 16, 2022

(65) Prior Publication Data
US 2023/0373526 A1  Nov. 23, 2023

(51) Int. Cl.
*B60W 60/00* (2020.01)
*B60W 30/18* (2012.01)
*B60W 50/14* (2020.01)

(52) U.S. Cl.
CPC .. *B60W 60/0015* (2020.02); *B60W 30/18163* (2013.01); *B60W 50/14* (2013.01);
(Continued)

(58) Field of Classification Search
CPC ....... B60W 60/0015; B60W 30/18163; B60W 50/14; B60W 2050/146;
(Continued)

(56) References Cited

U.S. PATENT DOCUMENTS

2019/0205664 A1  7/2019  Duan et al.
2020/0223449 A1*  7/2020  Tsuji ................. G08G 1/09626

FOREIGN PATENT DOCUMENTS

JP  2019-135643 A  8/2019

OTHER PUBLICATIONS

International Search Report (PCT/ISA/210) issued in PCT/JP2020/045979, dated Feb. 2, 2021.

* cited by examiner

*Primary Examiner* — Abby Y Lin
*Assistant Examiner* — Renee LaRose
(74) *Attorney, Agent, or Firm* — Birch, Stewart, Kolasch & Birch, LLP

(57) ABSTRACT

In a driving assistance control device, a surrounding vehicle recognition unit recognizes a position of a surrounding vehicle existing around a subject vehicle. A surrounding vehicle control information acquisition unit acquires surrounding vehicle control information including information as to whether or not the surrounding vehicle is performing traveling control using a high-definition map. A surrounding vehicle reliability determination unit determines traveling reliability of the surrounding vehicle. A driving assistance plan creation unit creates a driving assistance plan in which the subject vehicle is controlled to travel along the surrounding vehicle with the high traveling reliability as much as possible, or a driving assistance plan in which the subject vehicle is controlled not to travel along the surrounding vehicle with the low traveling reliability as much as possible on the basis of the traveling reliability of the surrounding vehicle.

13 Claims, 17 Drawing Sheets

(52) U.S. Cl.
CPC ............... *B60W 2050/146* (2013.01); *B60W 2554/4041* (2020.02); *B60W 2556/20* (2020.02); *B60W 2556/40* (2020.02)

(58) Field of Classification Search
CPC ..... B60W 2554/4041; B60W 2556/20; B60W 2556/40; B60W 2754/10
See application file for complete search history.

FIG. 8

| AUTONOMOUS DRIVING LEVEL | TRAVELING RELIABILITY | |
|---|---|---|
| | NOT PERFORMING TRAVELING CONTROL USING HIGH-DEFINITION MAP | PERFORMING TRAVELING CONTROL USING HIGH-DEFINITION MAP |
| 0 | 0 | 0 |
| 1 | 2 | 4 |
| 2 | 4 | 6 |
| 3 | 8 | 10 |
| 4 | 12 | 14 |
| 5 | 13 | 15 |

FIG. 9

| AUTONOMOUS DRIVING LEVEL | TRAVELING RELIABILITY | | |
|---|---|---|---|
| | NOT PERFORMING TRAVELING CONTROL USING MAP | PERFORMING TRAVELING CONTROL USING REGULAR-DEFINITION MAP | PERFORMING TRAVELING CONTROL USING HIGH-DEFINITION MAP |
| 0 | 0 | 0 | 0 |
| 1 | 2 | 3 | 4 |
| 2 | 4 | 5 | 6 |
| 3 | 8 | 9 | 10 |
| 4 | 12 | 13 | 14 |
| 5 | 13 | 14 | 15 |

FIG. 11

| AUTONOMOUS DRIVING LEVEL | TRAVELING CONTROL USING HIGH-DEFINITION MAP | FIRST RELIABILITY ELEMENT (R1) | SECOND RELIABILITY ELEMENT (R2) | TRAVELING RELIABILITY (R1+R2) |
|---|---|---|---|---|
| 0 | NOT PERFORMING | 0 | 0 | 0 |
| 0 | PERFORMING | 0.5 | 0 | 0.5 |
| 1 | NOT PERFORMING | 0 | 1 | 1.0 |
| 1 | PERFORMING | 0.5 | 1 | 1.5 |
| 2 | NOT PERFORMING | 0 | 2 | 2.0 |
| 2 | PERFORMING | 0.5 | 2 | 2.5 |
| 3 | NOT PERFORMING | 0 | 3 | 3.0 |
| 3 | PERFORMING | 0.5 | 3 | 3.5 |
| 4 | NOT PERFORMING | 0 | 4 | 4.0 |
| 4 | PERFORMING | 0.5 | 4 | 4.5 |
| 5 | NOT PERFORMING | 0 | 5 | 5.0 |
| 5 | PERFORMING | 0.5 | 5 | 5.5 |

F I G. 1 2

| AUTONOMOUS DRIVING LEVEL | TRAVELING CONTROL USING HIGH-DEFINITION MAP | FIRST RELIABILITY ELEMENT (R1) | SECOND RELIABILITY ELEMENT (R2) | TRAVELING RELIABILITY (R1+R2) |
|---|---|---|---|---|
| 0 | NOT PERFORMING | 0 | 0 | 0 |
| 0 | PERFORMING | 0 | 0 | 0 |
| 1 | NOT PERFORMING | 0 | 1 | 1 |
| 1 | PERFORMING | 2 | 1 | 3 |
| 2 | NOT PERFORMING | 0 | 2 | 2 |
| 2 | PERFORMING | 3 | 2 | 5 |
| 3 | NOT PERFORMING | 0 | 4 | 4 |
| 3 | PERFORMING | 3 | 4 | 7 |
| 4 | NOT PERFORMING | 0 | 6 | 6 |
| 4 | PERFORMING | 3 | 6 | 9 |
| 5 | NOT PERFORMING | 0 | 7 | 7 |
| 5 | PERFORMING | 3 | 7 | 10 |

F I G. 1 7
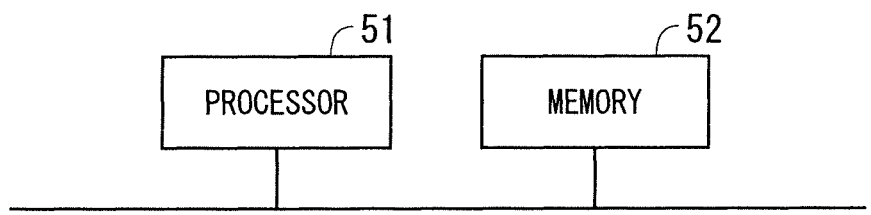

DRIVING ASSISTANCE CONTROL DEVICE AND DRIVING ASSISTANCE CONTROL METHOD

TECHNICAL FIELD

The present disclosure relates to a driving assistance control device that controls a driving assistance device for a vehicle.

BACKGROUND ART

In recent years, the development of a high-definition map that includes road data for each lane has progressed, and a driving assistance device such as an automatic driving device and an Advanced Driver-Assistance System (ADAS) device that performs traveling control using a high-definition map have been developed. For example, Patent Document 1 discloses a technique for improving the safety and reliability of a driving assistance device by using a high-definition map.

PRIOR ART DOCUMENTS

Patent Document(s)

[Patent Document 1] Japanese Patent Application Laid-Open No. 2019-135643

SUMMARY

Problem to be Solved by the Invention

The technique of Patent Document 1 is a technique for improving the traveling safety and reliability of a vehicle equipped with a driving assistance device using a high-definition map. No consideration is made to the improvement of the traveling safety and reliability of other vehicles that are not vehicles equipped with a driving assistance device using a high-definition map.

The present disclosure has been made to solve the above problems and aims to improve the traveling safety and reliability of other vehicles that are not vehicles equipped with a driving assistance device using a high-definition map.

Means to Solve the Problem

According to the present disclosure, a driving assistance control device includes a surrounding vehicle recognition unit configured to recognize a position of a surrounding vehicle being a non-subject vehicle existing around a subject vehicle, a surrounding vehicle control information acquisition unit configured to acquire surrounding vehicle control information including information as to whether or not the surrounding vehicle is performing traveling control using a high-definition map including road data for each lane, a surrounding vehicle reliability determination unit configured to determine traveling reliability being reliability of traveling of the surrounding vehicle on the basis of the surrounding vehicle control information, and a driving assistance plan creation unit configured to create a driving assistance plan in which the subject vehicle is controlled to travel along the surrounding vehicle with the traveling reliability being high as much as possible or a driving assistance plan in which the subject vehicle is controlled not to travel along the surrounding vehicle with the traveling reliability being low as much as possible on the basis of the traveling reliability of the surrounding vehicle, and control a driving assistance device of the subject vehicle according to the driving assistance plan.

Effects of the Invention

According to the present disclosure, the traveling safety and reliability of a subject vehicle improve by the surrounding vehicles performing traveling control using a high-definition map. That is, the improvement of the traveling safety and reliability of another vehicle that is not a vehicle equipped with a driving assistance device using a high-definition map is ensured.

The objects, features, aspects, and advantages of the present disclosure will become more apparent from the following detailed description and the accompanying drawings.

BRIEF DESCRIPTION OF DRAWINGS

FIG. 8 A table illustrating an example of traveling reliability in the second embodiment.

FIG. 9 A table illustrating an example of traveling reliability in the second embodiment.

FIG. 11 A table illustrating an example of traveling reliability in a modification of the second embodiment.

FIG. 12 A table illustrating an example of traveling reliability in a modification of the second embodiment.

FIG. 17 A diagram illustrating a hardware configuration example of the driving assistance control device.

DESCRIPTION OF EMBODIMENT(S)

First Embodiment

Figure 1:
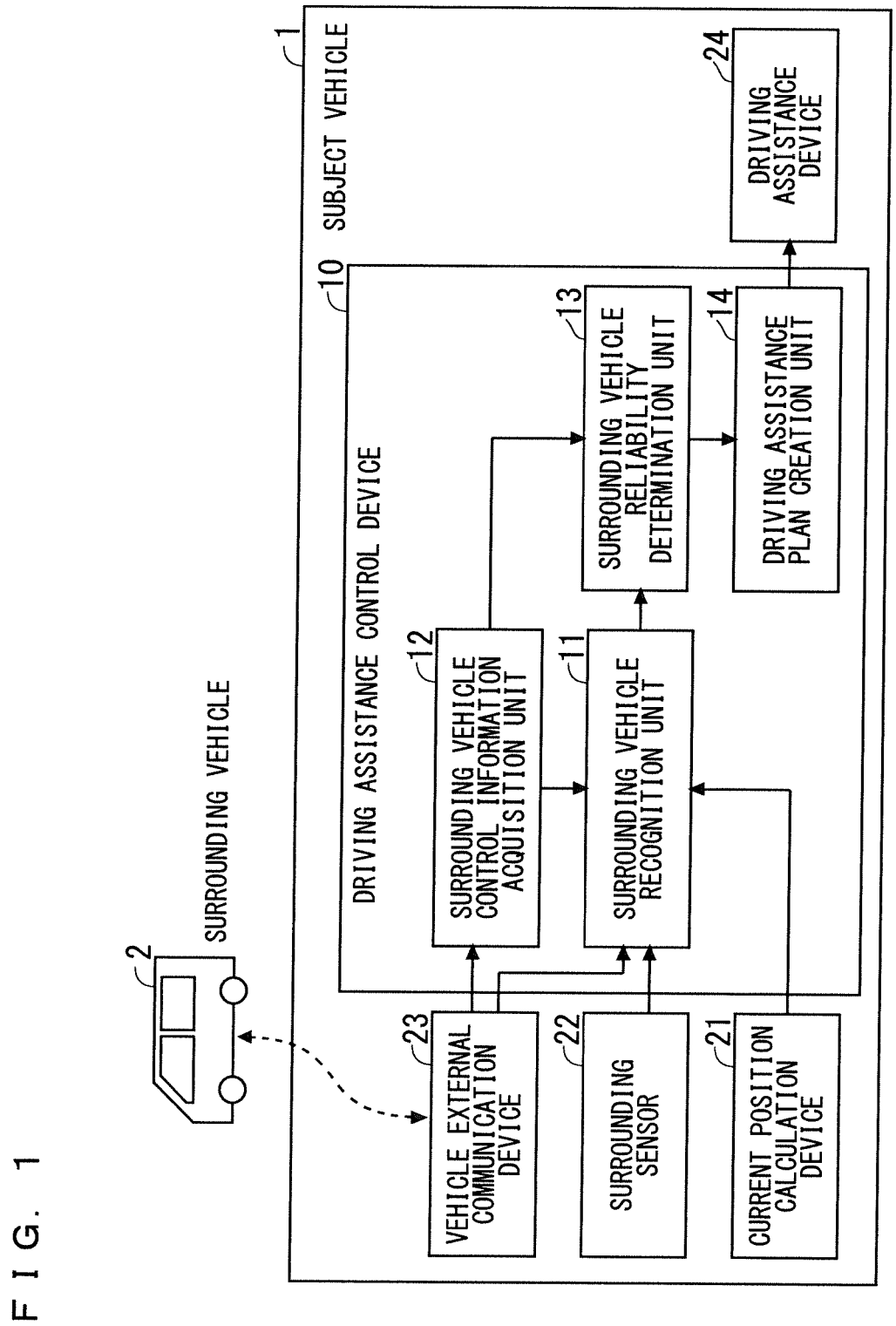
FIG. 1 A diagram illustrating a configuration of a driving assistance control device according to a first embodiment.

FIG. 1 is a diagram illustrating a configuration of a driving assistance control device 10 according to a first embodiment. In the present embodiment, it is assumed that the driving assistance control device 10 is installed in a vehicle 1, and the vehicle 1 equipped with the driving assistance control device 10 is hereinafter referred to as "subject vehicle". However, the driving assistance control device 10 does not have to be permanently installed in the subject vehicle 1, and can be implemented on a portable device such as a mobile phone, a smart phone, or a Portable Navigation Device (PND). Further, some functions of the driving assistance control device 10 may be implemented on a server installed outside the subject vehicle 1 and capable of communicating with the driving assistance control device 10.

As illustrated in FIG. 1, the driving assistance control device 10 is connected to a current position calculation device 21, a surrounding sensor 22, a vehicle external communication device 23, and a driving assistance device 24 provided in the subject vehicle 1.

The current position calculation device 21 is means for calculating the current position of the subject vehicle 1, and is composed of, for example, a Global Navigation Satellite System (GNSS) receiver. The current position calculation device 21 may have a function of correcting the position of the subject vehicle 1 calculated using GNSS by map matching using map information.

The surrounding sensor 22 is means for detecting objects existing around the subject vehicle 1. The surrounding sensor 22 is comprised of, for example, a camera (image processing sensor), a millimeter wave sensor, a Light Detection and Ranging (LiDAR), and the like, and can detect at least a position of a non-subject vehicle 2 existing in the vicinity of the subject vehicle 1. Hereinafter, the non-subject vehicle 2 existing around the subject vehicle 1 will be referred to as a "surrounding vehicle". Although only one surrounding vehicle 2 is illustrated in FIG. 1, there may be a plurality of surrounding vehicles 2.

The vehicle external communication device 23 is means for performing communication for the driving assistance control device 10 to acquire traveling control information, which is information relating to traveling control of the surrounding vehicle 2. The vehicle-external communication device 23 may be a communication device dedicated to the driving assistance control device 10, or may be a general-purpose communication device such as a cell phone or a smart phone. Here, it is assumed that the vehicle-external communication device 23 is to acquire the traveling control information from the surrounding vehicle 2 through vehicle-to-vehicle communication with the surrounding vehicle 2. However, any method may be adoptable to obtain the traveling control information. For example, the traveling control information of the surrounding vehicle 2 may be obtained from an infrastructure such as a roadside device or from a specific server.

Here, the position of the subject vehicle 1 calculated by the current position calculation device 21 is an absolute position (latitude, longitude, etc.). Meanwhile, the position of the surrounding vehicle 2 the surrounding sensor 22 detects is the relative position with respect to the subject vehicle 1, and is information indicating the distance and the direction from the subject vehicle 1 to the surrounding vehicle 2. When the driving assistance control device 10 does not require the information of the absolute position of the subject vehicle 1 and requires only the information of the relative position of the subject vehicle 1 with respect to the surrounding vehicles 2, the current position calculation device 21 may be omitted (When the driving assistance control device 10 uses map information, the current position calculation device 21 is typically required). Also, when the vehicle external communication device 23 can acquire not only the traveling control information of the surrounding vehicle 2 but also position information of the surrounding vehicle 2, the surrounding sensor 22 may be omitted.

The driving assistance device 24 is a device that assists driving of the subject vehicle 1. The driving assistance device 24 includes not only a device such as an autonomous driving device that controls the traveling of the subject vehicle 1, but also a notification device that notifies the driver of information for assisting the driving of the subject vehicle 1 using images and sounds (for example, an image display device, an audio output device, etc.) is included. The driving assistance device 24 starts operating according to an instruction from the driver of the subject vehicle 1, and the operation is controlled by the driving assistance control device 10.

As illustrated in FIG. 1, the driving assistance control device 10 includes a surrounding vehicle recognition unit 11, a surrounding vehicle control information acquisition unit 12, a surrounding vehicle reliability determination unit 13, and a driving assistance plan creation unit 14.

The surrounding vehicle recognition unit 11 recognizes the position of the surrounding vehicle 2 on the basis of the absolute position of the subject vehicle 1 the current position calculation device 21 has calculated and the relative position of the surrounding vehicle 2 with respect to the subject vehicle 1 the surrounding sensor 22 has detected. However, depending on the content of the driving assistance provided by the driving assistance control device 10, the surrounding vehicle recognition unit 11 need only recognize at least the relative position of the surrounding vehicle 2 with respect to the subject vehicle 1. The surrounding vehicle control information acquisition unit 12 uses the vehicle external communication device 23 to acquire surrounding vehicle control information including information as to whether or not the surrounding vehicle 2 is performing traveling control using a high-definition map.

Any method may be adoptable to associate the surrounding vehicle 2 the surrounding vehicle recognition unit 11 has recognized with the surrounding vehicle control information the surrounding vehicle control information acquisition unit 12 has acquired. For example, a method of collating the profile (vehicle type, license plate number, etc.) of the surrounding vehicle 2 detected by the surrounding sensor 22 with profile information of the surrounding vehicle 2 acquired by the vehicle external communication device 23, a method of collating the position of the surrounding vehicle 2 detected by the surrounding sensor 22 with the information on the position of the surrounding vehicle 2 acquired by the vehicle external communication device 23, and the like may be adoptable.

If the surrounding vehicle recognition unit 11 can acquire the surrounding vehicle control information of the surrounding vehicle 2 using the surrounding sensor 22, the vehicle external communication device 23 may be omitted. For example, when it is required by law to display on the outside of the vehicle whether or not traveling control using a high-definition map is being performed, it is considered that the surrounding vehicle control information can be acquired from the image of the surrounding vehicle 2 photographed by the camera as the surrounding sensor 22.

The surrounding vehicle reliability determination unit 13 determines traveling reliability, which is the reliability of the traveling of the surrounding vehicle 2, on the basis of the surrounding vehicle control information the surrounding vehicle control information acquisition unit 12 has acquired. The surrounding vehicle reliability determination unit 13 determines that the traveling reliability of the surrounding vehicle 2 performing the traveling control using the high-definition map is higher than the traveling reliability of the surrounding vehicle 2 not performing the traveling control using the high-definition map. In the first embodiment, two levels of "high" and "low" of the traveling reliability of the surrounding vehicle 2 are set, and the surrounding vehicle reliability determination unit 13 determines that the traveling reliability of the surrounding vehicle 2 performing the traveling control using the high-definition map is "high", and the traveling reliability of the surrounding vehicle 2 not performing the traveling control using the high-definition map is "low".

On the basis of the traveling reliability of the surrounding vehicle 2 the surrounding vehicle reliability determination unit 13 has determined, the driving assistance plan creation unit 14 creates a driving assistance plan in which the subject vehicle 1 is controlled to travel along the surrounding vehicle 2 with high traveling reliability as much as possible or a driving assistance plan in which the subject vehicle 1 is controlled not to travel along the surrounding vehicle 2 with low traveling reliability as much as possible. Further, the driving assistance plan creation unit 14 controls the driving assistance device 24 according to the created driving assistance plan.

Figure 2:
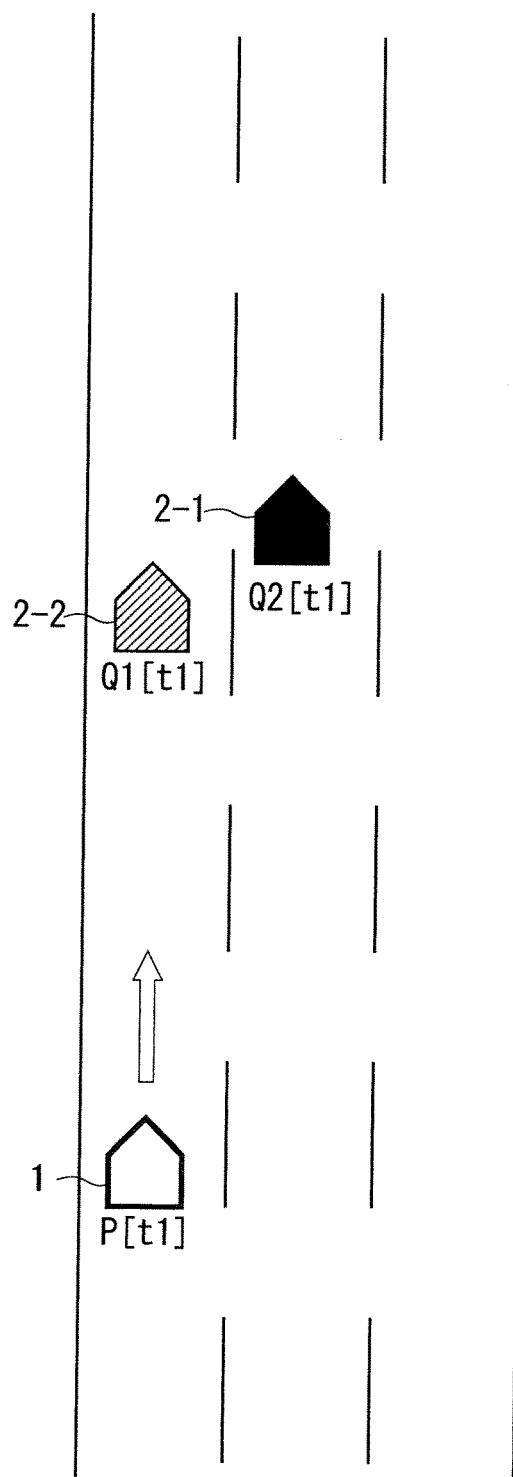
FIG. 2 A diagram illustrating an example of traveling positions of a subject vehicle and surrounding vehicles.

For example, at time t1, a situation is assumed as illustrated in FIG. 2, in which, the subject vehicle is in a traveling state at a position P[t1] by autonomous driving, and a surrounding vehicle 2-1 performing the traveling control using the high-definition map and a surrounding vehicle 2-2 not performing the traveling control using the high-definition map are traveling in front of the subject vehicle 1. The Society of Automotive Engineers (SAE) provides six levels of autonomous driving, from the level 0, which indicates full manual driving, to the level 5, in which full autonomous driving is maintained. Here, it is assumed that the subject vehicle 1 is set to the autonomous driving level 3, and is in a state where each type of driving control including constant speed driving, follow traveling, lane keeping driving, and autonomous lane change can be executable. However, the autonomous driving level of the subject vehicle 1 may be set to any of 0 to 5.

In a situation where there is no other vehicle around the subject vehicle 1, the subject vehicle 1 with the autonomous driving level 3 performs constant speed traveling and lane keeping traveling. As illustrated in FIG. 2, as the subject vehicle 1 approaches the surrounding vehicles 2-1 and 2-2 traveling ahead, in the driving assistance control device 10, the surrounding vehicle recognition unit 11 recognizes a position Q1[t1] of the surrounding vehicle 2-1 and a position Q2[t1] of the surrounding vehicle 2-2, and the surrounding vehicle control information acquisition unit 12 acquires the surrounding vehicle control information of the surrounding vehicles 2-1 and 2-2. The surrounding vehicle control information includes information as to whether or not each of the surrounding vehicle 2-1 and the surrounding vehicle 2-2 is performing the traveling control using the high-definition map, and the surrounding vehicle reliability determination unit 13 determines reliability of the surrounding vehicle 2-1 and reliability of the surrounding vehicle 2-2 on the basis of the surrounding vehicle control information. That is, the surrounding vehicle reliability determination unit 13 determines that the traveling reliability of the surrounding vehicle 2-1 performing the traveling control using the high-definition map is "high" and the traveling reliability of the surrounding vehicle 2-2 not performing the traveling control using the high-definition map is "low".

Figure 3:
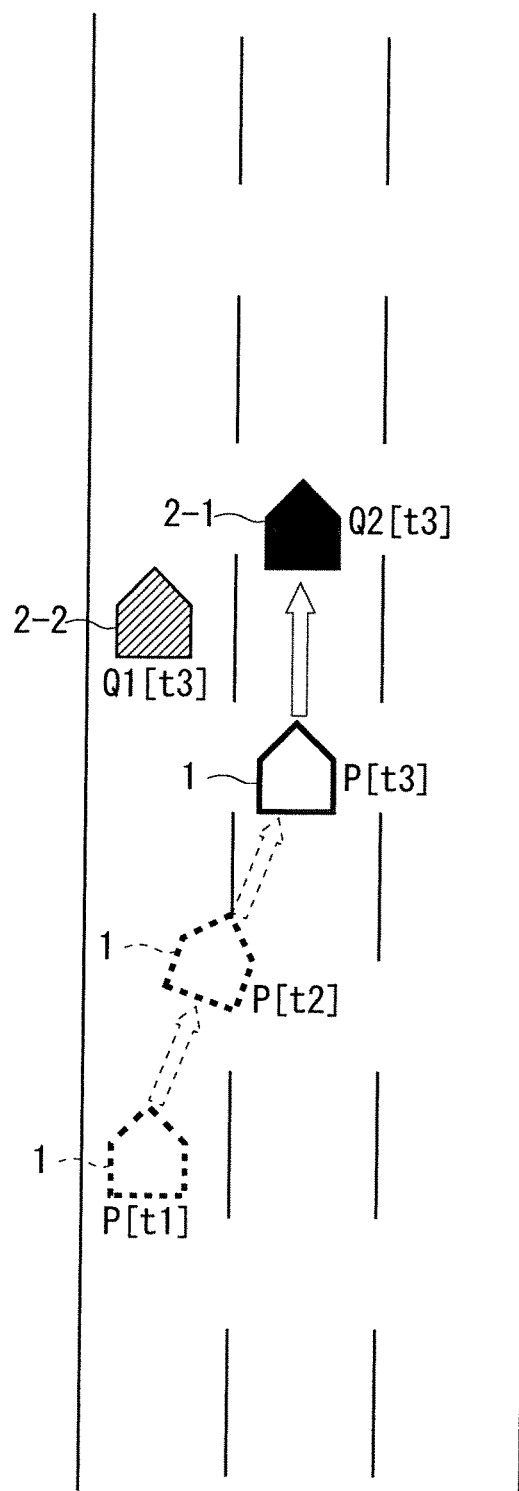
FIG. 3 A diagram illustrating an example of a driving assistance plan.

In this case, the driving assistance plan creation unit 14 creates a driving assistance plan in which the subject vehicle 1 is controlled to travel along the surrounding vehicle 2-1 as much as possible. For example, as illustrated in FIG. 3, a driving assistance plan is created in such a manner as to, at time t2, cause the subject vehicle 1 to change a lane into the same lane as the surrounding vehicle 2-1 by autonomous changing lanes, and at time t3, make the subject vehicle 1 follow the surrounding vehicle 2-1. And, the driving assistance plan creation unit 14 controls the driving assistance device 24 according to the created driving assistance plan. Accordingly, the subject vehicle 1 travels as illustrated in FIG. 3 and starts follow traveling the surrounding vehicle 2-1. By causing the subject vehicle 1 to follow the surrounding vehicle 2-1 with high traveling reliability, the safety and reliability of the traveling of the subject vehicle 1 are enhanced.

As described above, according to the driving assistance control device 10 according to the first embodiment, the safety and reliability of the traveling of the subject vehicle 1 is enhanced by utilizing the high reliability of the surrounding vehicle 2 performing the traveling control using the high-definition map. That is, the improvement of the traveling safety and reliability of another vehicle (the subject vehicle 1) that is not a vehicle equipped with a driving assistance device using a high-definition map (the surrounding vehicle 2) is ensured.

Figure 4:
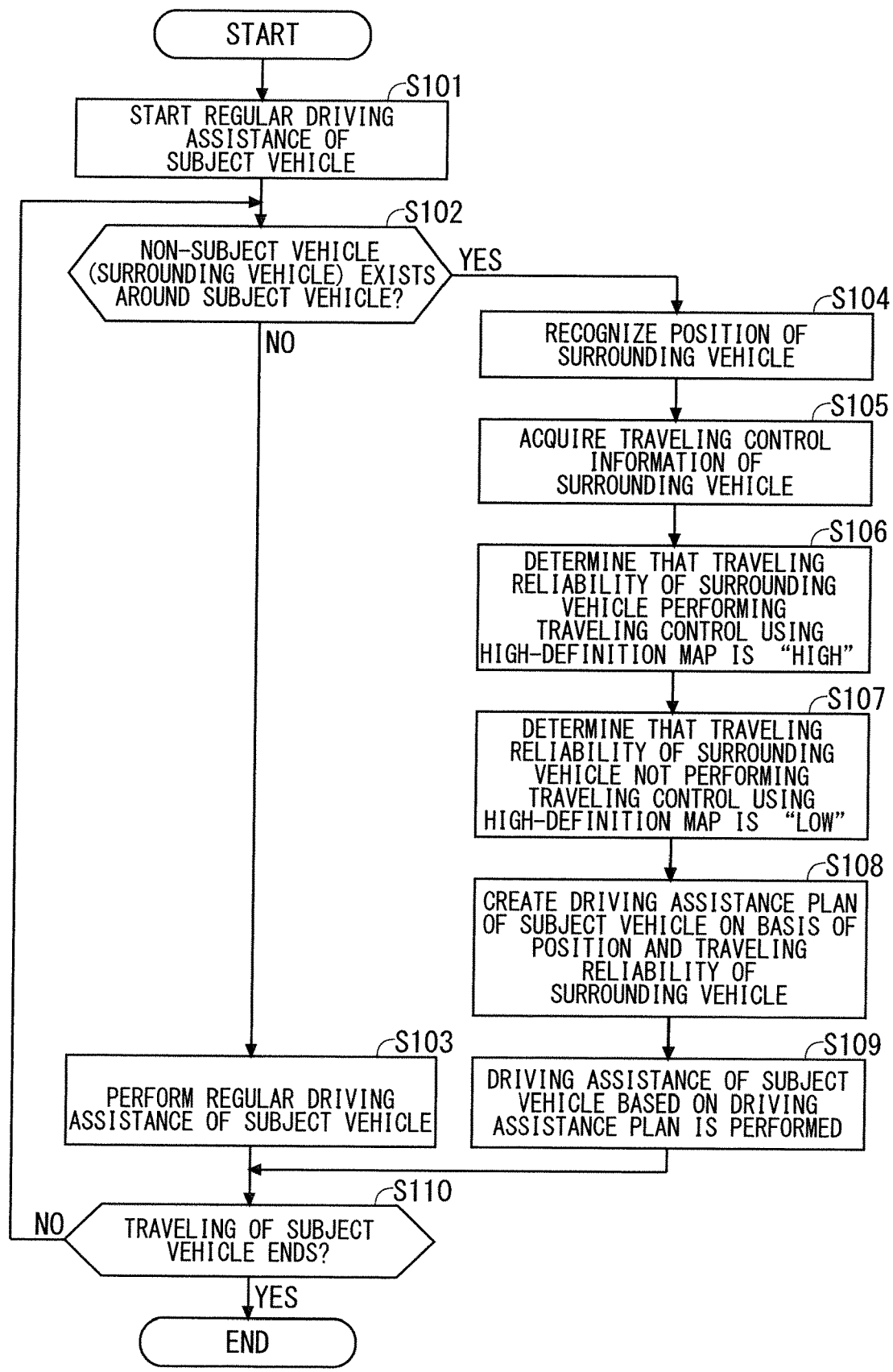
FIG. 4 A flowchart illustrating operation of a driving assistance control device according to a first embodiment.

FIG. 4 is a flowchart illustrating operation of the driving assistance control device 10 according to the first embodiment. Hereinafter, the operation of the driving assistance control device 10 will be described with reference to FIG. 4. In the following description, driving assistance of the related art in which the traveling reliability of the surrounding vehicle 2 is not considered is referred to as "regular driving assistance".

When the driving assistance control device 10 is activated, the driving assistance control device 10 causes the driving assistance device 24 to start regular driving assistance according to the autonomous driving level of the subject vehicle 1 set by the driver (Step S101).

Next, the surrounding vehicle recognition unit 11 confirms whether or not the surrounding vehicle 2 exists around the subject vehicle 1 on the bases of the detection result of the surrounding sensor 22 (Step S102). When there is no surrounding vehicle 2 around the subject vehicle 1 (NO in Step S102), the driving assistance control device 10 causes the driving assistance device 24 to perform (continue) regular driving assistance (Step S103).

On the other hand, when there is a surrounding vehicle 2 around the subject vehicle 1 (YES in Step S102), the surrounding vehicle recognition unit 11 recognizes the position of the surrounding vehicle 2 on the basis of the absolute position of the subject vehicle 1 the current position calculation device 21 has calculated and the relative position of the surrounding vehicle 2 with respect to the subject vehicle 1 the surrounding sensor 22 has detected (Step S104). Also, the surrounding vehicle control information acquisition unit 12 uses the vehicle external communication device 23 to acquire surrounding vehicle control information including information as to whether or not the surrounding vehicle 2 is performing traveling control using a high-definition map (Step S105).

Then, the surrounding vehicle reliability determination unit 13 determines the reliability of the traveling of the surrounding vehicle 2 on the basis of the surrounding vehicle control information. In the present embodiment, the surrounding vehicle reliability determination unit 13 determines that the traveling reliability of the surrounding vehicle 2 performing the traveling control using the high-definition map is "high" (Step S106), and the traveling reliability of the surrounding vehicle 2 not performing the traveling control using the high-definition map is "low" (Step S107).

It should be noted that the surrounding vehicle 2 from which the surrounding vehicle control information has hailed to be acquired may be regarded as not performing the traveling control using the high-definition map, and the traveling reliability thereof may be determined to be "low". The surrounding vehicle 2 from which the surrounding vehicle control information has hailed to be acquired but information indicating that it possesses the high-definition map has been acquired may be regarded as performing the traveling control using the high-definition map, and the traveling reliability thereof may be determined to be "high". Also, the traveling reliability of a surrounding vehicle 2, that is unrelated to the driving assistance of the subject vehicle 1, such as the surrounding vehicle 2 positioned behind the subject vehicle 1, may not be required to be determined.

Then, on the basis of the traveling reliability of the surrounding vehicle 2 the surrounding vehicle reliability determination unit 13 has determined, the driving assistance plan creation unit 14 creates a driving assistance plan in which the subject vehicle 1 is controlled to travel along the surrounding vehicle 2 with high traveling reliability as much as possible or a driving assistance plan in which the subject vehicle 1 is controlled not to travel along the surrounding vehicle 2 with low traveling reliability as much as possible (Step S108), and controls the driving assistance device 24 according to the driving assistance plan (Step S109).

Then, if the traveling of the subject vehicle 1 continues (NO in Step S110), the process returns to Step S102, and the driving assistance control device 10 repeats the operations of Steps S102 to S109. When the traveling of the subject vehicle 1 ends (YES in Step S110), the operation of the driving assistance control device 10 also ends.

[Modification]

Figure 5:
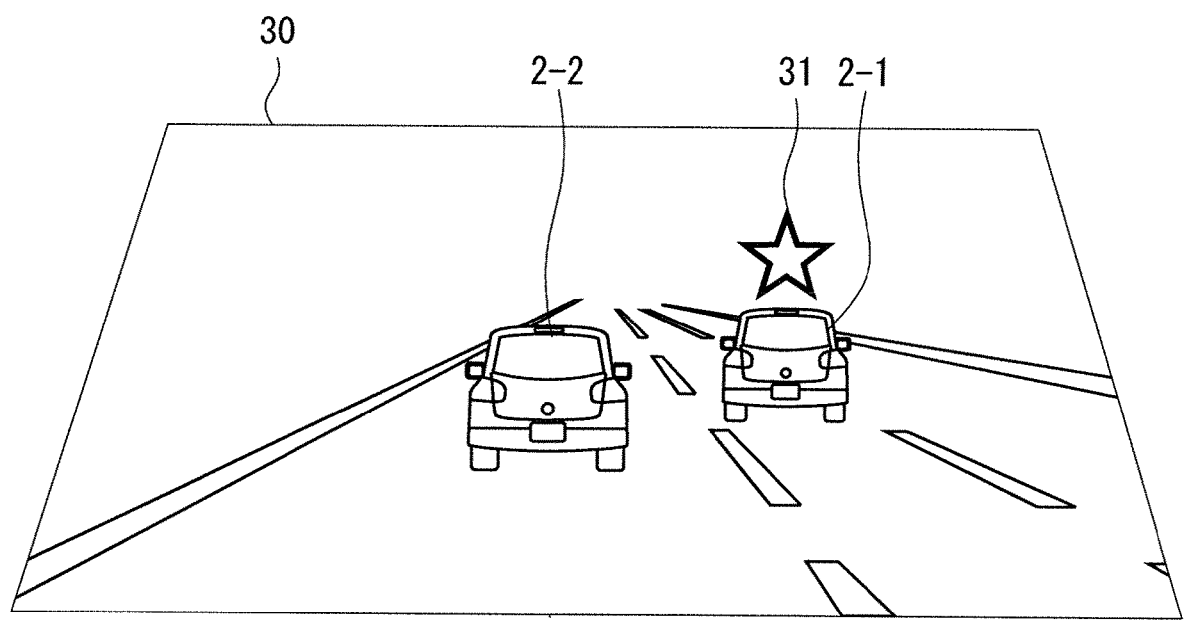
FIG. 5 A diagram illustrating a display example using HUD serving as a driving assistance device.

The driving assistance that the driving assistance control device 10 causes the driving assistance device 24 to perform does not have to be the traveling control as illustrated in FIG. 3 and may be notifying the driver of information for assisting the driving of the subject vehicle 1. For example, the driving assistance control device 10 may control a notification device serving as the driving assistance device 24 to indicate to the driver of the subject vehicle 1 the positions of the surrounding vehicle 2 with high traveling reliability. FIG. 5 illustrates an example that, in the situation illustrated in FIG. 2, the driving assistance control device 10 controls the Head-Up Display (HUD) serving as the driving assistance device 24 to display a display object 31 (star symbol) representing the position of the surrounding vehicle 2-1 with the traveling reliability "high" on a windshield 30 of the subject vehicle 1. By checking the display object 31, the driver can judge which of the surrounding vehicles 2 has the high traveling reliability, and even if it is during manual driving, the subject vehicle 1 being controlled to travel with the surrounding vehicle 2 with high traveling reliability can enhance the safety and reliability of the traveling of the subject vehicle 1.

Also, when the driver presses a follow traveling start button (not illustrated) with the display as illustrated in FIG. 5, the subject vehicle 1 may be switched to autonomous driving and travel as illustrated in FIG. 3, starting follow traveling following the surrounding vehicle 2-1.

The display object 31 in FIG. 5 is merely an example of a display object for driving assistance. Any display object for driving assistance may be adoptable, for example, an image of an arrow that guides the driver to change a lane to the same lane as the surrounding vehicle 2 with high traveling reliability or the like may be adoptable.

Also, the display device serving as the driving assistance device 24 is not limited to an HUD, and may be, for example, a liquid crystal display device. For example, an image (for example, a bird's-eye view image as illustrated in FIG. 2) showing the positions of the subject vehicle 1 and the surrounding vehicles 2 and the traveling reliability of the surrounding vehicles 2 may be displayed on the liquid crystal display device.

In the first embodiment, although an example is shown in which the subject vehicle 1 is controlled to follow the surrounding vehicle 2 with high traveling reliability, the application of the traveling reliability of the surrounding vehicle 2 is not limited thereto, and traveling reliability may be applied to various types of driving control.

For example, in a situation where the subject vehicle 1 is following the surrounding vehicle 2, when a speed VB of the surrounding vehicle 2, which is the preceding vehicle, becomes lower than a set speed VA of the subject vehicle 1 for constant-speed traveling, and the difference between VA and VB is equal to or greater than a predetermined threshold Vth (that is, VA−VB≥Vth), the traveling reliability of the surrounding vehicle 2 may be applied to the autonomous overtaking control that causes the subject vehicle 1 to overtake the preceding vehicle. Specifically, Vth=Vth1 representing the threshold when the traveling reliability of the preceding vehicle is "high" and Vth=Vth2 representing the threshold when the traveling reliability of the preceding vehicle is "low" are set to different values from each other, and Vth1>Vth2 may be set. That is, when the traveling reliability of the preceding vehicle is "high", the allowable range of VA-VB is made larger than when the traveling reliability of the preceding vehicle is "low". Accordingly, longer time for the subject vehicle 1 to follow the preceding vehicle with the "high" traveling reliability can be expected, which contributes to improving the safety and reliability of the traveling of the subject vehicle 1.

It is considered that the surrounding vehicle 2 with high traveling reliability is less likely to brake suddenly. Therefore, when the traveling reliability of the preceding vehicle is "high", the inter-vehicle distance between the subject vehicle 1 and the preceding vehicle may be shorter than when the traveling reliability of the preceding vehicle is "low".

When the surrounding vehicle 2 traveling in a lane adjacent to the subject vehicle 1 exists, the traveling control in which traveling side-by-side is to be avoided and an inter-vehicle distance between the surrounding vehicle 2 in the adjacent lane and the subject vehicle 1 (inter-vehicle distance along the traveling direction therebetween) is to be kept is preferably performed. In this case, when the traveling reliability of the surrounding vehicle 2 in the adjacent lane is "high", it may be set that a shorter inter-vehicle distance between the subject vehicle 1 and the surrounding vehicle 2 be allowable than that when the traveling reliability of the surrounding vehicle 2 in the adjacent lane is "low".

In addition, in the traveling control for selecting a lane in which the subject vehicle 1 is to travel from among a plurality of lanes, it may also be set such that a lane in which the surrounding vehicle 2 with "high" traveling reliability traveling ahead tends to be selected rather than a lane in which the surrounding vehicle 2 with "low" traveling reliability. It may also be set such that a lane in which no surrounding vehicle 2 exists within a certain distance ahead (for example, 200 m) tends to be selected.

Although, in the first embodiment, two levels of "high" and "low" are set for the traveling reliability of the surrounding vehicle 2, three or more levels may be set. For example, three levels may be set in a manner of "high" for the traveling reliability of a surrounding vehicle 2 performing traveling control using a high-definition map that includes road data for each lane, "middle" for the traveling reliability of a surrounding vehicle 2 performing traveling control using a regular-definition map that does not include road data for each lane, and "low" for the traveling reliability of a surrounding vehicle 2 not performing traveling control using a map. However, in that case, it is required to include information as to whether or not the surrounding vehicle 2 is performing traveling control using the regular-definition map in the surrounding vehicle control information.

Figure 6:
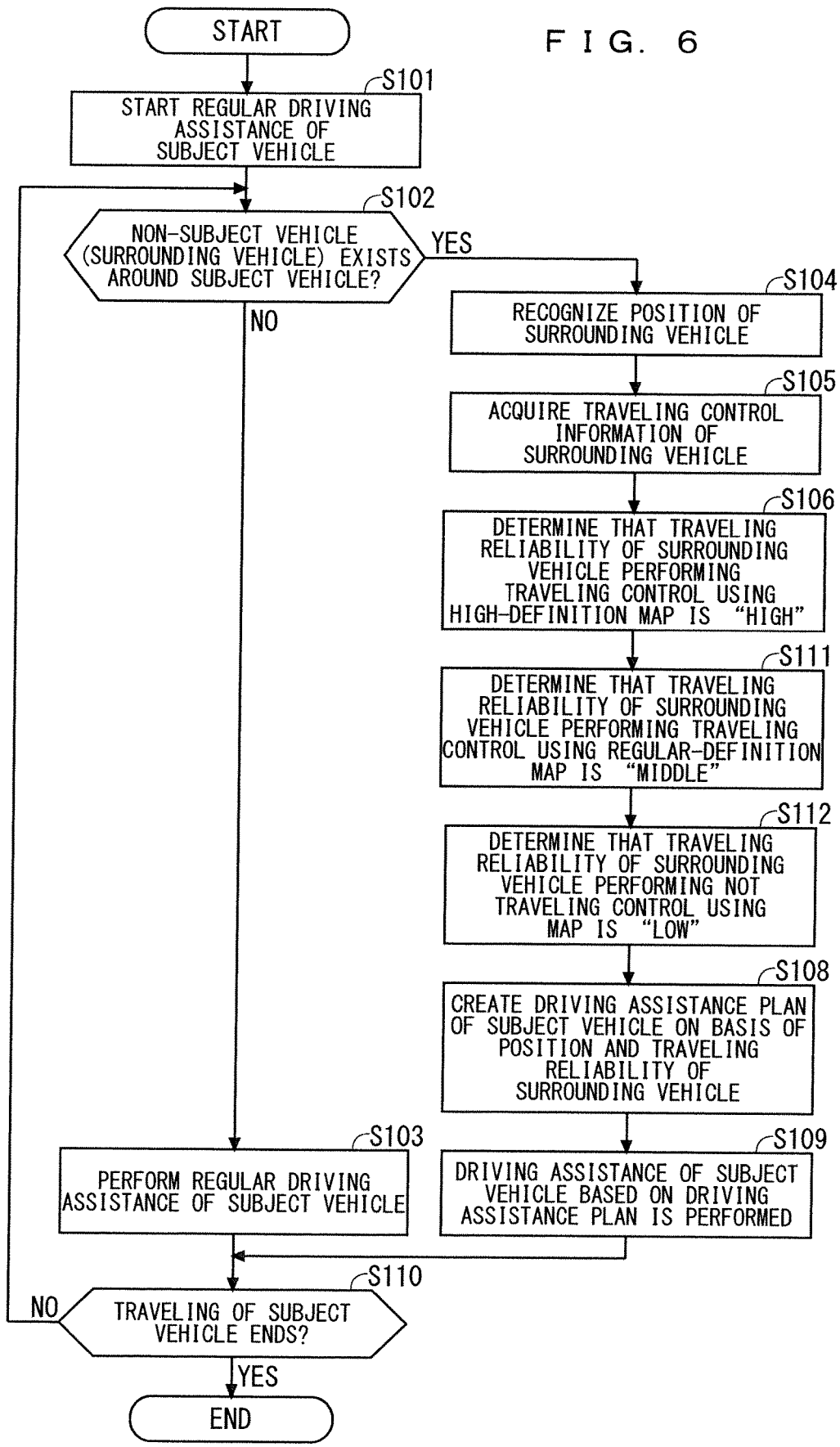
FIG. 6 A flowchart illustrating operation of a driving assistance control device according to a modification of the first embodiment.

FIG. 6 is a flowchart illustrating the operation of the driving assistance control device 10 with the traveling reliability having the above three levels. FIG. 6 is a flow in which Step S107 of the flow of FIG. 4 is replaced with Steps S111 and S112. In the flow of FIG. 6, the surrounding vehicle reliability determination unit 13 determines the traveling reliability of a surrounding vehicle 2 performing the traveling control using the high-definition map as "high", the traveling reliability of a surrounding vehicle 2 performing the traveling control using the regular-definition map as "middle", and the traveling reliability of a surrounding vehicle 2 not performing the traveling control using a map as "low". The other Steps are the same as those of the flow of FIG. 4; therefore, the description thereof is omitted here.

Also, high-definition maps differ in terms of representation and precision of road shapes depending on specifications such as suppliers and versions. Therefore, it is preferable that the specifications of the high-definition map used by the subject vehicle 1 for traveling control and the high-definition map used by the surrounding vehicle 2 for traveling control are closer to each other. Therefore, with the information on the specifications of the high-definition map used by the surrounding vehicles included in the surrounding vehicle control information, the surrounding vehicle reliability determination unit 13 may determine that the surrounding vehicle 2, which uses a high-definition map with a specification closer to the specification of the high-definition map of the subject vehicle 1, has higher traveling reliability. It may also determine that the surrounding vehicle 2 that uses a latest version of the high-definition map has a higher traveling reliability.

When the traveling reliability has multi-levels of three or more levels, the display mode of the display object 31 illustrated in FIG. 5 may be changed according to the level of the traveling reliability. Also, the display mode of the display object 31 may be changed so that the surrounding vehicle 2 with the highest traveling reliability and the surrounding vehicle 2 with the lowest traveling reliability can be identified. Further, it may also be set that the display object 31 is added to the surrounding vehicle 2 having the traveling reliability equal to or higher than a predetermined threshold.

Second Embodiment

In the second embodiment, the surrounding vehicle reliability determination unit 13 of the driving assistance control device 10 determines the reliability of the traveling of the surrounding vehicle 2 with an autonomous driving level of the surrounding vehicle 2 added. A configuration of the driving assistance control device 10 according to the second embodiment is the same as that of the first embodiment (FIG. 1). However, the surrounding vehicle control information to be acquired by the surrounding vehicle control information acquisition unit 12 includes, in addition to information as to whether or not the surrounding vehicle 2 is performing traveling control using a high-definition map, information on the autonomous driving level on which the surrounding vehicle 2 is performing the traveling control.

Figure 7:
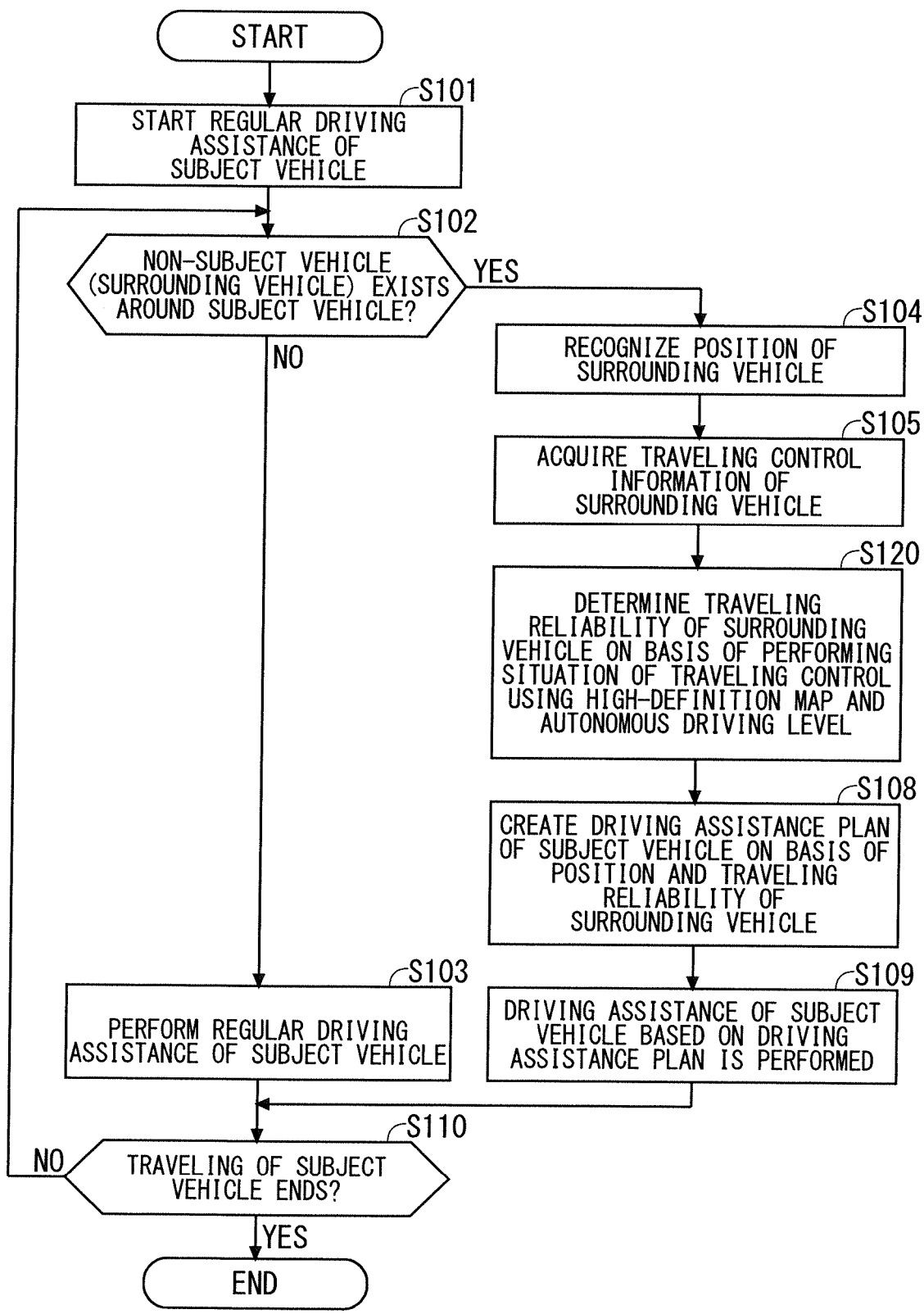
FIG. 7 A flowchart illustrating operation of a driving assistance control device according to a second embodiment.

FIG. 7 is a flowchart illustrating the operation of the driving assistance control device 10 according to the second embodiment. FIG. 7 is a flow in which Steps S106 and S107 of the flow of FIG. 4 are replaced with Step S120. In Step S120, the surrounding vehicle reliability determination unit 13 determines the traveling reliability of the surrounding vehicle 2 on the basis of the performing situation of the traveling control using the high-definition map in the surrounding vehicle 2 and the autonomous driving level the surrounding vehicle 2 is performing on. The other Steps are the same as those of the flow of FIG. 4; therefore, the description thereof is omitted here.

FIGS. 8 and 9 illustrate an example of a relationship between performing situations of the traveling control and the autonomous driving levels of the surrounding vehicle 2 and the traveling reliability of the surrounding vehicle 2 determined by the surrounding vehicle reliability determination unit 13.

As illustrated in FIG. 8, the surrounding vehicle reliability determination unit 13 determines that the surrounding vehicle 2 with a higher autonomous driving level has higher traveling reliability and, in the same autonomous driving levels, the traveling reliability of the surrounding vehicle 2 performing traveling control using the high-definition map is higher than that of the surrounding vehicle 2 not performing traveling control using the high-definition map. Also, in the case where traveling control using the regular-definition map is added in the determination of the traveling reliability, as illustrated in FIG. 9, in the same autonomous driving levels, the surrounding vehicle reliability determination unit 13 determines that the traveling reliability of the surrounding vehicle 2 performing traveling control using the regular-definition map is lower than the traveling reliability of the surrounding vehicle 2 performing traveling control using the high-definition map, and is higher than the traveling reliability of the surrounding vehicle 2 not performing traveling control using a map.

[Modification]

The surrounding vehicle reliability determination unit 13 may calculate a first reliability element of the surrounding vehicle 2 calculated on the basis of whether or not traveling control using the high-definition map is being performed and a second reliability element of the surrounding vehicle 2 calculated on the basis of the autonomous driving level, respectively, and determine the traveling reliability of the surrounding vehicle 2 on the basis of the calculated first reliability element and second reliability element.

Figure 10:
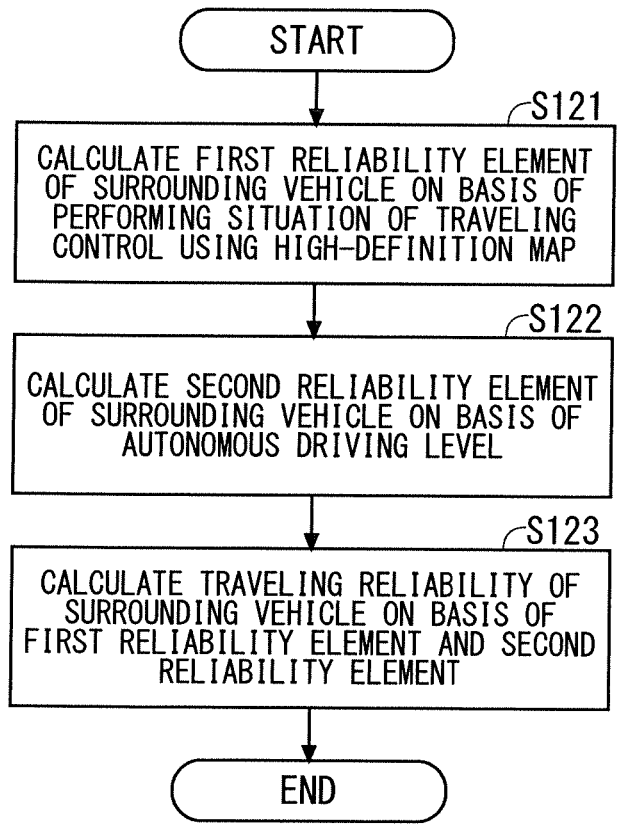
FIG. 10 A flowchart illustrating operation of a surrounding vehicle reliability determination unit in a modification of the second embodiment.

In this case, in Step S120 of the flow of FIG. 7, the flow of FIG. 10 is performed by the surrounding vehicle reliability determination unit 13. That is, the surrounding vehicle reliability determination unit 13 calculates the first reliability element of the surrounding vehicle 2 on the basis of whether or not the traveling control using the high-definition map is being performed (Step S121), and calculates the second reliability element of the surrounding vehicle 2 on the basis of the autonomous driving level (Step S122). Then, the surrounding vehicle reliability determination unit 13 determines the traveling reliability of the surrounding vehicle 2 based on the first reliability element calculated in Step S121 and the second reliability element calculated in Step S122 (Step S123).

FIGS. 11 and 12 illustrate an example of a relationship between the performing situation of the traveling control and the autonomous driving level of the surrounding vehicle 2 and the first reliability element, the second reliability element, and the traveling reliability.

In the example of FIG. 11, the first reliability element (R1) takes a value of 0.5 if the surrounding vehicle 2 is performing traveling control using the high-definition map, and takes a value of 0 if it is not. That is, the first reliability element is a function of whether or not the surrounding vehicle 2 is performing traveling control using the high-definition map. On the other hand, the second reliability element (R2) takes a larger value as the autonomous driving level of the surrounding vehicle 2 is higher. In other words, the second reliability element is a function of the autonomous driving level of the surrounding vehicle 2. The traveling reliability of the surrounding vehicle 2 is defined as the sum (R1+R2) of the first reliability element and the second reliability element.

In the example of FIG. 12, the first reliability element (R1) takes a higher value as the autonomous driving level is higher if the surrounding vehicle 2 is performing traveling control using the high-definition map, and takes a value of 0 if it is not. That is, the first reliability element is a function of whether or not the surrounding vehicle 2 is performing traveling control using the high-definition map and the autonomous driving level thereof. On the other hand, the second reliability element (R2) takes a larger value as the autonomous driving level of the surrounding vehicle 2 is higher. In other words, the second reliability element is a function of the autonomous driving level of the surrounding vehicle 2. The traveling reliability of the surrounding vehicle 2 is defined as the sum (R1+R2) of the first reliability element and the second reliability element.

In FIGS. 11 and 12, it is set that the higher the autonomous driving level, the greater the difference between the first reliability element and the second reliability element. In addition, in FIG. 12, it is set that the second reliability element changes significantly between the autonomous driving levels 2 and 3, and between autonomous driving levels 3 and 4, where the quality of automated driving changes.

FIGS. 11 and 12 are mere examples, and other methods are adoptable as long as the traveling reliability is higher as the surrounding vehicle 2 has a higher autonomous driving level, and, in the same driving levels, the surrounding vehicle 2 performing traveling control using the high-definition map has the higher traveling reliability than that of the surrounding vehicle 2 not performing traveling control using the high-definition map.

In the second embodiment, the surrounding vehicle control information the surrounding vehicle control information acquisition unit 12 acquires includes the information of the autonomous driving level of the surrounding vehicle 2; therefore, as illustrated in FIG. 5, when the traveling reliability of the surrounding vehicle 2 is to be displayed on a display device such as a HUD, a display object indicating the autonomous driving level of the surrounding vehicle 2 may further be displayed.

Third Embodiment

In the first and second embodiments, the "surrounding" range of the subject vehicle 1 corresponds to the detection range of the surrounding sensor 22. In the third embodiment, the "surrounding" range is broadened, and for example, a range of several kilometers from the subject vehicle 1 is considered as "surroundings". In other words, a vehicle that exists within a range of several kilometers from the subject vehicle 1 is a surrounding vehicle 2. However, a vehicle outside the detection range of the surrounding sensor 22 cannot be detected by the surrounding sensor 22. Therefore, the surrounding vehicle recognition unit 11 uses the vehicle external communication device 23 to acquire a position of the surrounding vehicle 2 that is outside the detection range of the surrounding sensor 22. Alternatively, the surrounding vehicle recognition unit 11 may acquire the positions of all the surrounding vehicles 2 using the vehicle external communication device 23, in which case the surrounding sensor 22 may be omitted.

The size of the "surroundings" may be determined according to the contents of control performed by the driving assistance control device 10. In addition, the "surrounding" range of the subject vehicle 1 does not have to be a circle centered on the subject vehicle 1. For example, a range within 500 m ahead of the subject vehicle 1 and within 50 m behind the subject vehicle 1 may be defined as the "surroundings" of the subject vehicle 1.

Figure 13:
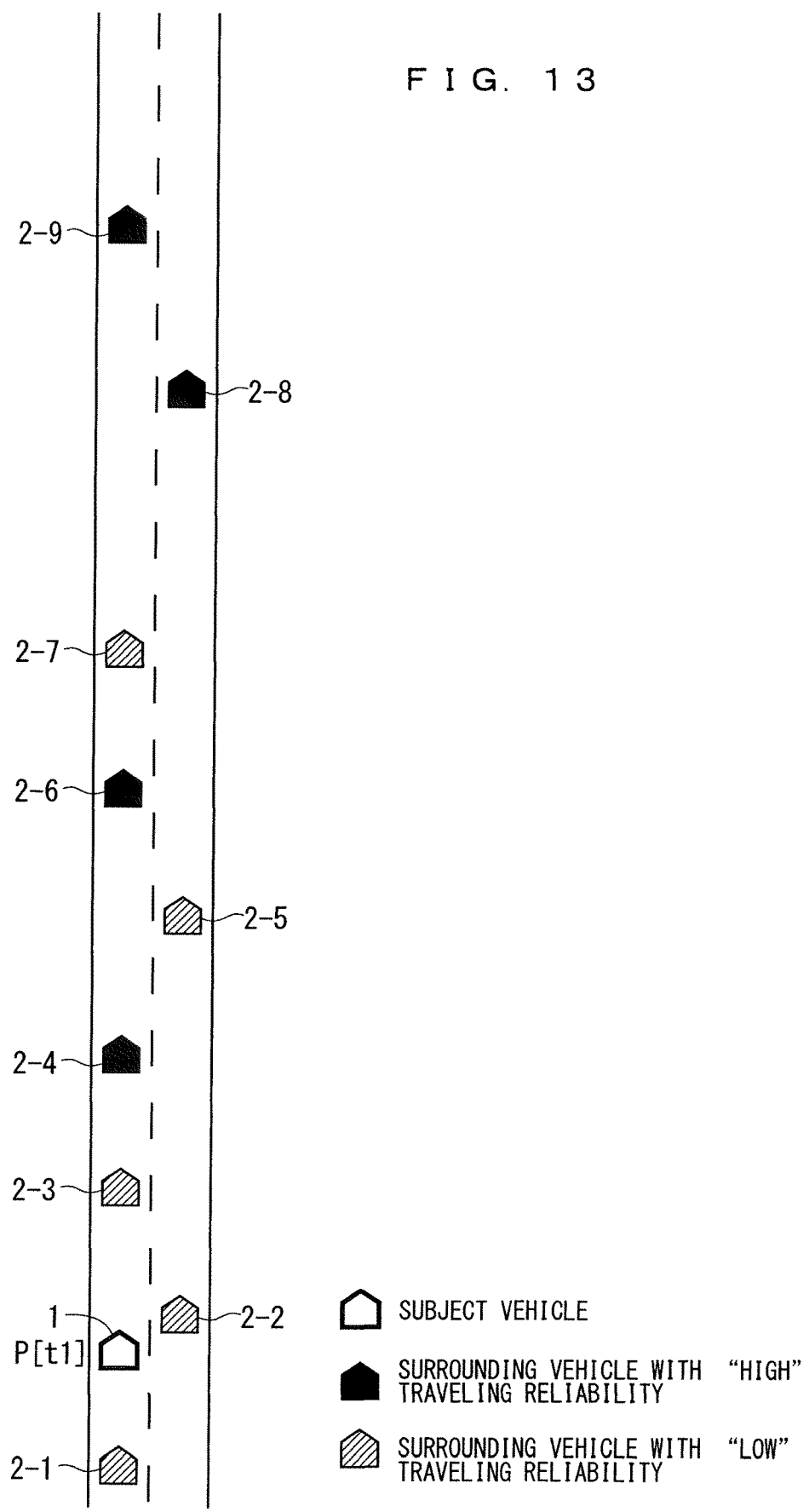
FIG. 13 A diagram illustrating an example of traveling positions of a subject vehicle and surrounding vehicles.

For example, it is assumed that as a result of the surrounding vehicle recognition unit 11 recognizes the positions of the surrounding vehicles 2 exist within a range of 500 m ahead and 50 m behind the subject vehicle 1 and the surrounding vehicle reliability determination unit 13 determines the traveling reliability of the surrounding vehicles 2, at time t1, the distribution of the surrounding vehicles 2 (2-1 to 2-9) and the traveling reliability as illustrated in FIG. 13 has been obtained.

For simplification of explanation, as in the first embodiment, two levels of "high" and "low" are set for the traveling reliability. In addition, it is assumed that the speeds of all the surrounding vehicles 2 are the same, and the positional relationship of the surrounding vehicles 2 does not change over time. In addition, when there is a surrounding vehicle 2 with the "low" traveling reliability (that is, a surrounding vehicle 2 that does not perform traveling control using the high-definition map) in front of, behind, or on the side of the subject vehicle, it is assumed that the subject vehicle 1 is at certain driving risk. The terms front, behind, and side as used herein mean front, behind, and side within a predetermined distance from the subject vehicle 1, respectively.

Figure 14:
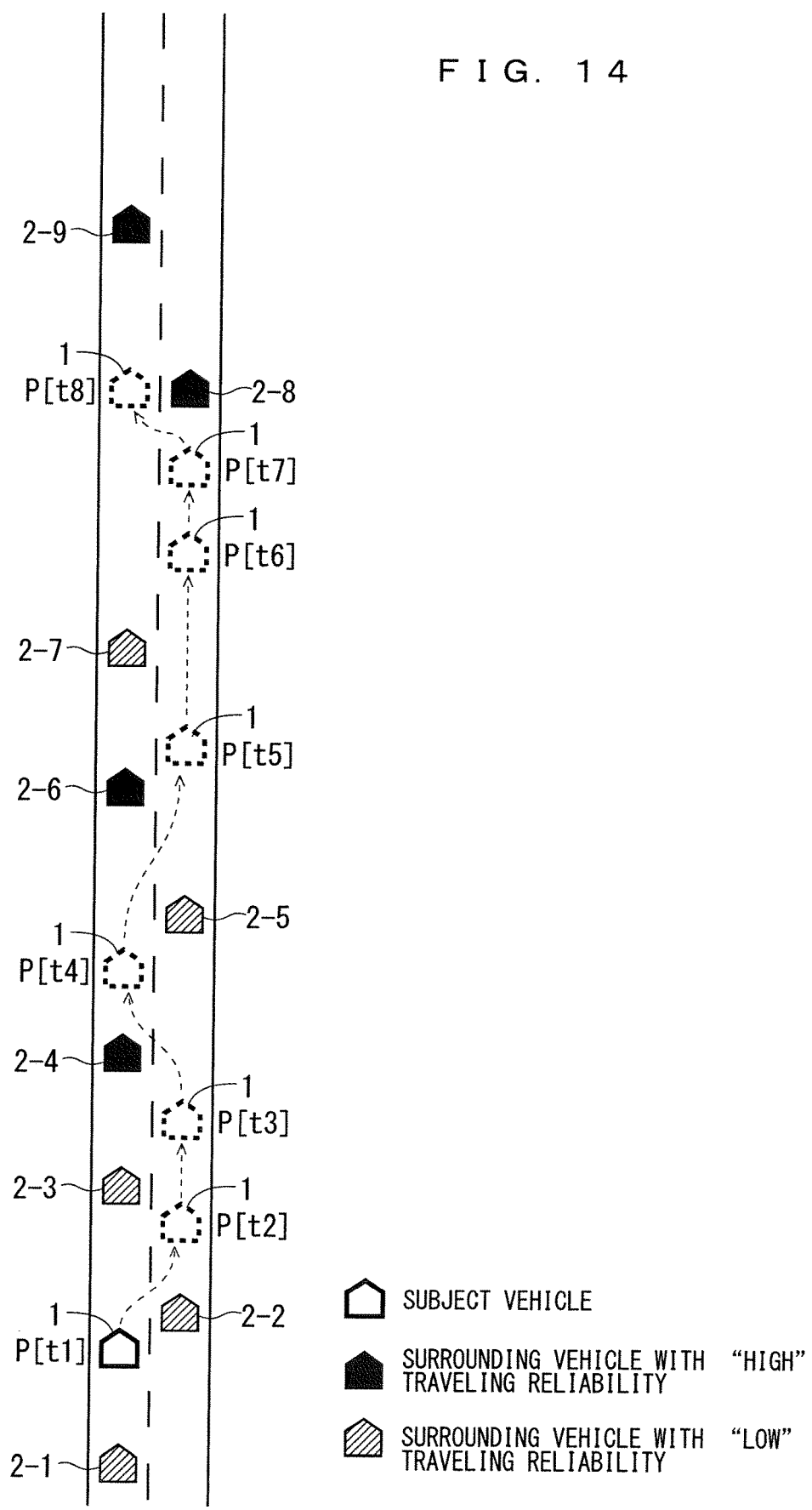
FIG. 14 A diagram for explaining the driving risk of the subject vehicle.

For example, when the subject vehicle 1 moves from the state of FIG. 13 to the state illustrated in FIG. 14, when the subject vehicle 1 is at a position P[t1], the driving risk at this point is 3 points since there are the surrounding vehicles 2 (2-1 to 2-3) with "low" traveling reliability in three directions, i.e., in front of, behind, and to the right of the subject vehicle 1. When the subject vehicle 1 is at a position P[t2], the driving risk at this point is 2 points since there are the surrounding vehicles 2 (2-2 and 2-3) with "low" traveling reliability in the two directions behind and to the left of the subject vehicle 1. Further, when the subject vehicle 1 is at a position P[t8], the driving risk at this point is 0 points with no surrounding vehicle 2 with "low" travailing reliability existing in any direction (the surrounding vehicle 2-7 is sufficiently far from the subject vehicle 1).

The value of the driving risk of the surrounding vehicle 2 with the "low" traveling reliability may change according to the positional relationship between the surrounding vehicle 2 and the subject vehicle 1. For example, it may be provided that the traveling risk of the surrounding vehicle 2 ahead of the subject vehicle 1 is 1.5 points, the driving risk of the surrounding vehicle 2 behind the subject vehicle 1 is 1 point, and the driving risk of the surrounding vehicle 2 on the side of the own vehicle 1 is 1.5 points. Alternatively, the smaller the distance from the subject vehicle 1 to the surrounding vehicle 2, the higher the driving risk of the surrounding vehicle 2 becomes.

The driving assistance plan creation unit 14 of the third embodiment calculates the driving risk of the subject vehicle 1 at each position on the basis of the positional relationship between the subject vehicle 1 and the surrounding vehicles 2 with the "low" traveling reliability. Then, the driving assistance plan creation unit 14 creates a driving assistance plan in which the subject vehicle 1 is controlled to move to the position where the driving risk is minimized (the position P[t8] in FIG. 13), that is, the position where the number of surrounding vehicles 2 near the subject vehicle 1 with low traveling reliability is low. And the driving assistance device 24 of the subject vehicle 1 is controlled according to the created driving assistance plan. In practice, there are differences in the speed among each of the surrounding vehicles 2; therefore, the calculation of the driving risk and the creation of the driving assistance plan are implemented with consideration of the change in the positional relationship among the surrounding vehicles 2 as well.

According to the driving assistance control device 10 of the third embodiment, a driving assistance plan is created to minimize the number of surrounding vehicles 2 with low traveling reliability existing in the vicinity of the subject vehicle 1 as few as possible, and driving assistance is performed according to the plan; therefore, the driving risk of the subject vehicle 1 can be reduced, and the safety and reliability of traveling of the subject vehicle 1 improve.

[Modification]

Although in the third embodiment, lanes in which surrounding vehicles 2 are traveling are distinguished, the driving risk may be calculated from the positional relationship between the subject vehicle 1 and the surrounding vehicles 2 in the traveling direction alone without distinguishing the lanes. That is, it may also be set such that there is no difference between the driving risk of the surrounding vehicle 2 in the same lane as the subject vehicle 1 is and the driving risk of the surrounding vehicle 2 in the adjacent lane.

Also, although FIG. 14 illustrates an example in which the subject vehicle 1 overtakes in order to move to a position where there are fewer surrounding vehicles 2 with the "low" traveling reliability", overtaking may not necessarily be implemented, and only the selection of the lane in which the subject vehicle 1 travels may be implemented. That is, the surrounding vehicle reliability determination unit 13 calculates the number and density of the surrounding vehicles 2 with the "high" traveling reliability and the number and density of the surrounding vehicles 2 with the "low" traveling reliability for each lane and determines which lane has a low risk for the subject vehicle 1 to travel to create a driving assistance plan in which the subject vehicle 1 is controlled to travel in a lane with a low driving risk. A lane with the low driving risk is a lane with many surrounding vehicles 2 with the "high" traveling reliability or a lane with few surrounding vehicles 2 with the "low" traveling reliability.

Further, when the subject vehicle 1 changes lanes to the overtaking lane and returns to the original lane, the driving assistance control device 10 may control the position at which the subject vehicle 1 returns in the original lane with the consideration given of the number and density of the surrounding vehicles 2 with the "high" traveling reliability and the surrounding vehicles 2 with the "low" traveling reliability in the original lane. For example, in the situation illustrated in FIG. 15 (the right lane is the overtaking lane), an area 32 where there is no surrounding vehicle 2 with the "low" traveling reliability nearby is a recommended position for the subject vehicle 1 to return in the original lane (left lane).

Figure 15:
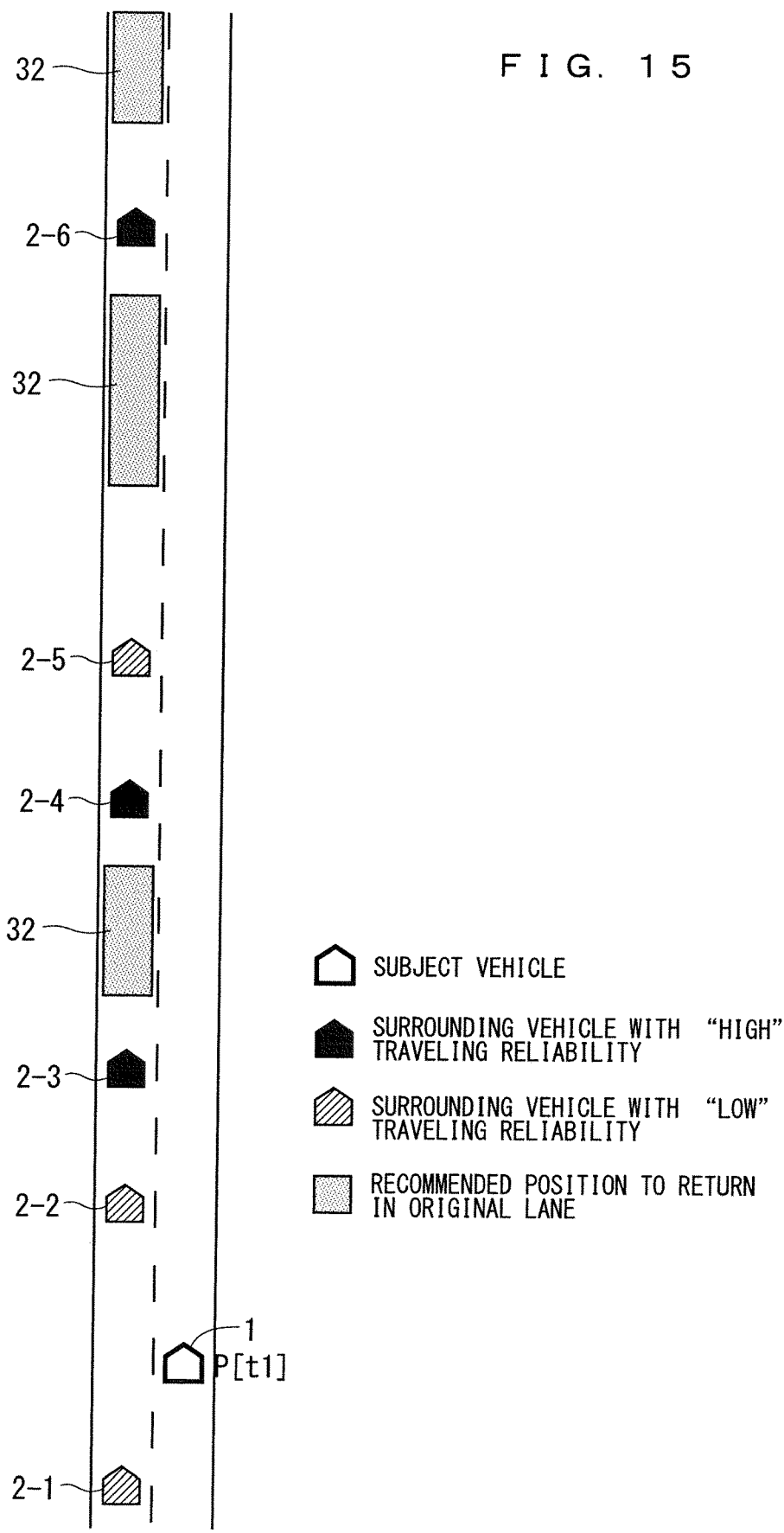
FIG. 15 A diagram illustrating an example of a recommended position to return to the original lane after changing lanes.

Although in the third embodiment, traveling control is performed as driving assistance by the driving assistance device 24, the driving assistance may be notification of information for assisting the driving of the subject vehicle 1 to the driver. For example, an image illustrating the distribution of surrounding vehicles 2 as illustrated in FIG. 13, an image illustrating a recommended route as illustrated in FIG. 14, an image illustrating a recommended position to return to the original lane after overtaking as illustrated in FIG. 15 and the like may be presented to the driver.

<Hardware Configuration>

Figure 16:
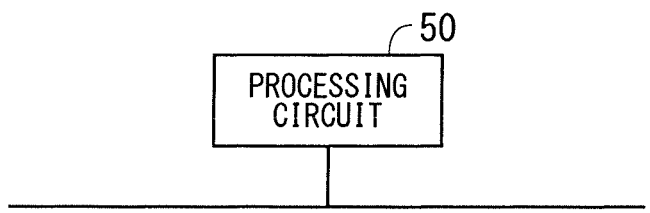
FIG. 16 A diagram illustrating a hardware configuration example of the driving assistance control device.

FIGS. 16 and 17 are diagrams respectively illustrating hardware configuration examples of the driving assistance control device 10. Each function of the components of the driving assistance control device 10 illustrated in FIG. 1 is implemented by, for example, a processing circuit 50 illustrated in FIG. 16. That is, the driving assistance control device 10 includes the processing circuit 50 configured to recognize the position of the surrounding vehicle, which is a non-subject vehicle existing in the vicinity of the subject vehicle, acquire surrounding vehicle control information including information on whether or not the surrounding vehicle is performing traveling control using the high-definition map including road data for each lane, determine the traveling reliability, which is the reliability of traveling of the surrounding vehicle on the basis of the surrounding vehicle control information, create a driving assistance plan in which the subject vehicle is controlled to travel along the surrounding vehicle with the high traveling reliability as much as possible or a driving assistance plan in which the subject vehicle is controlled not to travel along the surrounding vehicle with the low traveling reliability as much as possible on the basis of the traveling reliability of the surrounding vehicle to control the driving assistance device of the subject vehicle according to the driving assistance plan. The processing circuit 50 may be dedicated hardware, or a processor (also referred to as a central processing unit (CPU), a processing unit, an arithmetic unit, a microprocessor, a microcomputer, a Digital Signal Processor (DSP) that executes a program stored in a memory).

When the dedicated hardware is applied to the processing circuit 50, the processing circuit 50 corresponds, for example, to a single circuit, a composite circuit, a programmed processor, a parallel programmed processor, an Application Specific Integrated Circuit (ASIC), or a Field-Programmable Gate Array (FPGA), or the combination thereof. In the driving assistance device 10, each function of the components may be implemented by individual processing circuits, or these functions may be collectively implemented by one processing circuit.

FIG. 17 illustrates an example of the hardware configuration of the driving assistance control device 10 when the processing circuit 50 is configured using a processor 51 that executes programs. In this case, the function of each component of the driving assistance device 10 is implemented by software (in combination with software, firmware, or in combination with software and firmware), etc. The software etc. is written as a program and stored in a memory 52. The processor 51 reads out and executes the program stored in the memory 52, thereby implementing the function of each section. That is, the driving assistance control device 10 includes the memory 52 for storing the program which, eventually, executes a process of recognizing the position of the surrounding vehicle, which is a non-subject vehicle existing in the vicinity of the subject vehicle, a process of acquiring surrounding vehicle control information including information on whether or not the surrounding vehicle is performing traveling control using the high-definition map including road data for each lane, a process of determining the traveling reliability, which is the reliability of traveling of the surrounding vehicle on the basis of the surrounding vehicle control information, create a driving assistance plan in which the subject vehicle is controlled to travel along the surrounding vehicle with the high traveling reliability as much as possible or a driving assistance plan in which the subject vehicle is controlled not to travel along the surrounding vehicle with the low traveling reliability as much as possible on the basis of the traveling reliability of the surrounding vehicle to control the driving assistance device of the subject vehicle according to the driving assistance plan, when executed by the processor 51. In other words, the program can be said to cause the computer to execute procedures and methods of operation of the components of the driving assistance control device 10.

Here, the memory 52 may be, for example, a non-volatile or volatile semiconductor memory, such as a Random Access Memory (RAM), a Read Only Memory (ROM), a flash memory, an Erasable Programmable Read Only Memory (EPROM), an Electrically Erasable Programmable Read Only Memory (EEPROM), or the like, a HDD (Hard Disk Drive), a magnetic disk, a flexible disk, an optical disk, a compact disk, a digital versatile disc (DVD) and a drive therefor or the like, or any storage medium used in the future.

The configuration in which the function of each component of the driving assistance control device 10 is implemented by either hardware or software has been described above. However, the configuration is not limited thereto, a configuration in which some components of the driving assistance control device 10 are implemented by dedicated hardware and some other components are implemented by software or the like may be adoptable. For example, for some components, the functions are implemented by the processing circuit 50 as dedicated hardware, and for some other components, the functions are implemented by the processing circuit 50 as the processor 51 reading and executing the program stored in the memory 52.

Accordingly, the driving assistance control device 10 can implement the above each function by hardware, software, firmware, or a combination thereof.

The embodiments can be combined, appropriately modified or omitted, without departing from the scope of the disclosure.

The foregoing description is in all aspects illustrative and not restrictive, and it is therefore understood that numerous modifications can be devised.

EXPLANATION OF REFERENCE SIGNS

1 subject vehicle, 2 surrounding vehicle, 10 driving assistance control device, 11 surrounding vehicle recognition unit, 12 surrounding vehicle control information acquisition unit, 13 surrounding vehicle reliability determination unit, 14 driving assistance plan creation unit, 21 current position calculation device, 22 surrounding sensor, 23 vehicle external communication device, 24 driving assistance device, 30 windshield, 31 display object, 50 processing circuit, 51 processor, 52 memory.

The invention claimed is:

1. A driving assistance control device comprising:
a processor to execute a program; and
a memory to store the program which, when executed by the processor, performs processes of:
recognizing a position of a surrounding vehicle being a non-subject vehicle existing around a subject vehicle;
acquiring surrounding vehicle control information including information as to whether or not the surrounding vehicle is performing traveling control using a high-definition map including road data for each lane;
determining traveling reliability being reliability of traveling of the surrounding vehicle on the basis of the surrounding vehicle control information; and
creating a driving assistance plan in which the subject vehicle is controlled to follow the surrounding vehicle with the traveling reliability being high or a driving assistance plan in which the subject vehicle is controlled not to follow the surrounding vehicle with the traveling reliability being low on the basis of the traveling reliability of the surrounding vehicle, and controlling a driving assistance device of the subject vehicle according to the driving assistance plan, wherein
the processor determines that the traveling reliability of the surrounding vehicle performing traveling control using the high-definition map is higher than the traveling reliability of the surrounding vehicle not performing traveling control using the high-definition map.

2. The driving assistance control device according to claim 1, wherein
the surrounding vehicle control information further includes information on an autonomous driving level on which the surrounding vehicle is performing, and
the processor determines traveling reliability of the surrounding vehicle with the autonomous driving level added.

3. The driving assistance control device according to claim 2, wherein
the processor calculates a first reliability element of the surrounding vehicle calculated on the basis of whether or not traveling control using the high-definition map is being performed and a second reliability element of the surrounding vehicle calculated on the basis of the autonomous driving level, and determines the traveling reliability of the surrounding vehicle on the basis of the first reliability element and the second reliability element.

4. The driving assistance control device according to claim 1, wherein
the processor creates the driving assistance plan to make the subject vehicle travel following the surrounding vehicle having the traveling reliability being high.

5. The driving assistance control device according to claim 1, wherein
the processor creates the driving assistance plan in which a number of surrounding vehicles with the traveling reliability being low existing in a vicinity of the subject vehicle as few as possible.

6. The driving assistance control device according to claim 1, wherein
the processor creates the driving assistance plan in which the subject vehicle is controlled to travel in a lane with the many surrounding vehicles with the traveling reliability being high, or the driving assistance plan in which the subject vehicle is controlled to travel in a lane with the few surrounding vehicles with the traveling reliability being low.

7. The driving assistance control device according to claim 6, wherein,
when the subject vehicle changes a lane and overtakes a non-subject vehicle, the processor determines a position to return to an original lane after overtaking on the basis of the traveling reliability of the surrounding vehicle.

8. The driving assistance control device according to claim 1, wherein
a driving method to control the subject vehicle to travel according to the driving assistance plan is notified to a driver of the subject vehicle.

9. The driving assistance control device according to claim 8, wherein
notification of the driving method includes displaying, on a display device, a traveling position at which the subject vehicle is controlled to follow the surrounding vehicle with the traveling reliability being high, or a traveling position at which the subject vehicle is controlled not to travel along the surrounding vehicle with the traveling reliability being low.

10. The driving assistance control device according to claim 1, wherein
the surrounding vehicle control information further includes information on a specification of the high-definition map the surrounding vehicle uses, and
the processor determines that the surrounding vehicle using the high-definition map with a specification closer to a specification of the high-definition map of the subject vehicle has the traveling reliability being higher.

11. The driving assistance control device according to claim 1, wherein
the surrounding vehicle control information further includes information as to whether or not the surrounding vehicle is performing traveling control using a regular-definition map that does not include road data for each lane, and
the processor determines that the traveling reliability of the surrounding vehicle performing traveling control using the regular-definition map is lower than the traveling reliability of the surrounding vehicle performing traveling control using the high-definition map, and is higher than the traveling reliability of the surrounding vehicle not performing traveling control using a map.

12. The driving assistance control device according to claim 11, wherein
the surrounding vehicle control information further includes information on an autonomous driving level on which the surrounding vehicle is performing, and
the processor determines traveling reliability of the surrounding vehicle with the autonomous driving level added.

13. A driving assistance control method comprising:
recognizing a position of a surrounding vehicle being a non-subject vehicle existing around a subject vehicle;
acquiring surrounding vehicle control information including information as to whether or not the surrounding vehicle is performing traveling control using a high-definition map including road date for each lane;
determining traveling reliability being reliability of traveling of the surrounding vehicle on the basis of the surrounding vehicle control information; and
creating a driving assistance plan in which the subject vehicle is controlled to follow the surrounding vehicle with the traveling reliability being high or a driving assistance plan in which the subject vehicle is controlled not to follow the surrounding vehicle with the traveling reliability being low on the basis of the traveling reliability of the surrounding vehicle, and controlling a driving assistance device of the subject vehicle according to the driving assistance plan, wherein
the processor determines that the traveling reliability of the surrounding vehicle performing traveling control using the high-definition map is higher than the traveling reliability of the surrounding vehicle not performing traveling control using the high-definition map.

\* \* \* \* \*